US009572310B1

(12) United States Patent
Anderson (10) Patent No.: US 9,572,310 B1
(45) Date of Patent: Feb. 21, 2017

(54) METHOD FOR DELIVERING NUTRIENTS TO THE PLANTS IN A HYDROPONIC SYSTEM

(71) Applicant: Zepplin Anderson, Moore, OK (US)

(72) Inventor: Zepplin Anderson, Moore, OK (US)

(*) Notice: Subject to any disclaimer, the term of this patent is extended or adjusted under 35 U.S.C. 154(b) by 0 days.

(21) Appl. No.: 15/297,020

(22) Filed: Oct. 18, 2016

Related U.S. Application Data

(62) Division of application No. 14/842,153, filed on Sep. 1, 2015, now Pat. No. 9,497,907.

(51) Int. Cl.
*A01G 31/02* (2006.01)
*A01G 31/00* (2006.01)

(52) U.S. Cl.
CPC ............. *A01G 31/02* (2013.01); *A01G 31/001* (2013.01); *A01G 2031/006* (2013.01)

(58) Field of Classification Search
CPC .......... A01G 31/02; A01G 9/24; A01G 9/247; A01G 25/02; A01G 27/006; A01G 31/00; A01G 2031/006
See application file for complete search history.

(56) References Cited

U.S. PATENT DOCUMENTS

| | | | | |
|---|---|---|---|---|
| 4,584,791 A * | 4/1986 | Wolf | ...................... | A01G 31/02 47/48.5 |
| 4,669,217 A * | 6/1987 | Fraze | ................... | A01G 31/001 47/59 R |
| 5,161,327 A * | 11/1992 | Campbell | .............. | A01G 31/02 47/82 |
| 5,557,884 A * | 9/1996 | Deppe | .................... | A01G 31/02 47/62 E |
| 6,247,268 B1 * | 6/2001 | Auer | ...................... | A01G 31/02 47/62 A |
| 9,125,349 B2 * | 9/2015 | Leavitt | ..................... | A01G 9/02 |
| 2001/0047617 A1 * | 12/2001 | Blossom | ................ | A01G 31/02 47/62 R |
| 2006/0021278 A1 * | 2/2006 | McCardle | ............. | A01G 9/247 47/39 |
| 2011/0067301 A1 * | 3/2011 | Demitchell | ........... | A01G 31/02 47/62 C |
| 2014/0135593 A1 * | 5/2014 | Jayalth | ................. | A61B 5/0022 600/301 |
| 2015/0135593 A1 * | 5/2015 | Ross | ....................... | A01G 31/02 47/62 R |
| 2015/0216131 A1 * | 8/2015 | Van Wingerden | ... | A01G 9/1026 47/59 R |
| 2015/0342133 A1 * | 12/2015 | Nakajima | .............. | A01G 31/02 47/62 R |

* cited by examiner

*Primary Examiner* — Monica Williams
(74) *Attorney, Agent, or Firm* — Barry Choobin; Patent 360

(57) ABSTRACT

The embodiments herein relate to a method for delivering nutrients to the plants in a hydroponic system. The method comprises delivering a nutrient solution, planting a plurality of plants in a plurality of plant receivers, combining a plurality of angled joints with a single side of one plastic pipe with rest of the plastic pipes, combining a plurality of T-fitting/connectors with the plurality of plastic pipes, closing an end of the plastic pipes with a plurality of pipe caps and delivering water to the plurality of pipes using a customizable water pipe. The method further comprises adjusting the plurality of plastic pipes with an adjustable pipe brace and circulating the nutrient solution in the reservoir to the plurality of plant receivers using an electrical pump.

5 Claims, 8 Drawing Sheets

METHOD FOR DELIVERING NUTRIENTS TO THE PLANTS IN A HYDROPONIC SYSTEM

BACKGROUND

Technical Field

The embodiments herein are generally related to a horticultural system. The embodiments herein are particularly related to a hydroponic plant growth system. The embodiments herein are more particularly related to a method of plantation using an indoor/outdoor hydroponic nutrient delivery system with a self-contained reservoir.

Description of the Related Art

Hydroponics is defined as a method and a system of growing plants and other vegetation without the use of soil. The hydroponic systems are designed to deliver a nutrient solution to the plants at a controlled and predictable rate periodically. The delivery of the nutrient solution to the plants at a controlled rate causes an accelerated plant growth within the limited spaces.

In the conventional hydroponic nutrient delivery systems, the nutrient solution is periodically filled and drained. This conventional system is not desirable, as there is a lack of continuous flow of the nutrient solution, which results in stunted growth of the plants. Further, the conventional hydroponic systems require the external reservoirs to deliver the nutrient solution and the reservoirs consume more space. Furthermore, the conventional hydroponic systems are not cost effective.

Hence, there is a need for a new method of conducting plantation using hydroponic nutrient delivery system that includes self-contained reservoirs. Further, there is a need for a method of plantation that allows a continuous flow of the nutrient solution, which results in an efficient growth of the plants. Still further, there is a need for a method of plantation using hydroponic system that consumes less space and provides economic value for the users.

The above-mentioned shortcomings, disadvantages and problems are addressed herein and which will be understood by reading and studying the following specification.

OBJECTS OF THE EMBODIMENTS HEREIN

The various embodiments herein provide a method for hydroponic nutrient delivery to indoor and outdoor plants.

The primary object of the embodiments herein is to provide a method of delivering nutrient solution to indoor and outdoor plants using a hydroponic system having a self-contained reservoir.

Another object of the embodiment herein is to provide a method of planting indoor and outdoor plants using a hydroponic system that provides a continuous flow of the nutrient solution to the roots of the plants.

Yet another object of the embodiments herein is to provide a method of planting indoor and outdoor plants using a hydroponic system that occupies a lesser space than the conventional systems.

Yet another object of the embodiments herein is to provide a method of planting indoor and outdoor plants using a hydroponic system that is cost-effective.

Yet another object of the embodiments herein is to provide a method of planting indoor and outdoor plants using a hydroponic system that is easily used by a novice and as well as by advanced users.

Yet another object of the embodiments herein is to provide a method of planting indoor and outdoor plants using a hydroponic system that allows the users to have customized gardens.

Yet another object of the embodiments herein is to provide a method of planting indoor and outdoor plants using a hydroponic system that is easy to clean.

Yet another object of the embodiments herein is to provide a method of planting indoor and outdoor plants using a hydroponic system that has an option to customize and modify the system based on the available area for the plant growth and the type of the plant grown.

Yet another object of the embodiments herein is to provide a method of planting indoor and outdoor plants using a hydroponic system that does not require an addition of oxygen to the nutrients in the self-contained reservoirs when stored at the controlled conditions.

These and other objects and advantages of the embodiments herein will become readily apparent from the following detailed description taken in conjunction with the accompanying drawings.

SUMMARY

The embodiments herein provide a method for delivering nutrients to the plants in a hydroponic system. The method comprises delivering a nutrient solution. The nutrient solution is delivered through a plurality of plastic pipes. The plurality of pipes act as a reservoir for storing and feeding the nutrient solution to a plurality of plants. The length of the plurality of plastic pipes are customized based on a requirement of a user and a type of plant grown.

The method further comprises planting a plurality of plants in a plurality of plant receivers. The plurality of plant receivers are cavities arranged in the plurality of plastic pipes and the size and depth of the plant receivers are varied based on a requirement of a user and a type of plant grown.

The method further comprises combining a plurality of angled joints with a single side of one plastic pipe with rest of the plastic pipes. The plurality of the angled joints are combined using a standard plumbing technique.

The method further comprises combining a plurality of T-fitting/connectors with the plurality of plastic pipes. The plurality of T-fitting/connectors are combined with the plurality of pipes using a standard plumbing technique.

The method further comprises closing an end of the plastic pipes with a plurality of pipe caps and delivering water to the plurality of pipes using a customizable water pipe.

The method further comprises adjusting the plurality of plastic pipes with an adjustable pipe brace. The adjustable pipe brace and a nut is configured to vary a height and tilt of the hydroponic solution and circulating the nutrient solution in the reservoir to the plurality of plant receivers using an electrical pump.

The method further comprises varying a height and a tilt of the plurality of pipes using an adjustable pipe lift nut. The adjustable pipe lift nut is placed on the adjustable pipe brace.

The method further comprises customizing using an extra pipe according to needs of a user and the plant. The extra pipe length is combined with the plurality of the plastic pipes using a standard plumbing techniques.

According to an embodiment herein, the nutrients are delivered to the plants in an indoor environment.

According to another embodiment herein, the nutrients are delivered to the plants in an outdoor environment.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE INVENTION

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a method for delivering nutrients to the plants in a hydroponic system.

Figure 1:
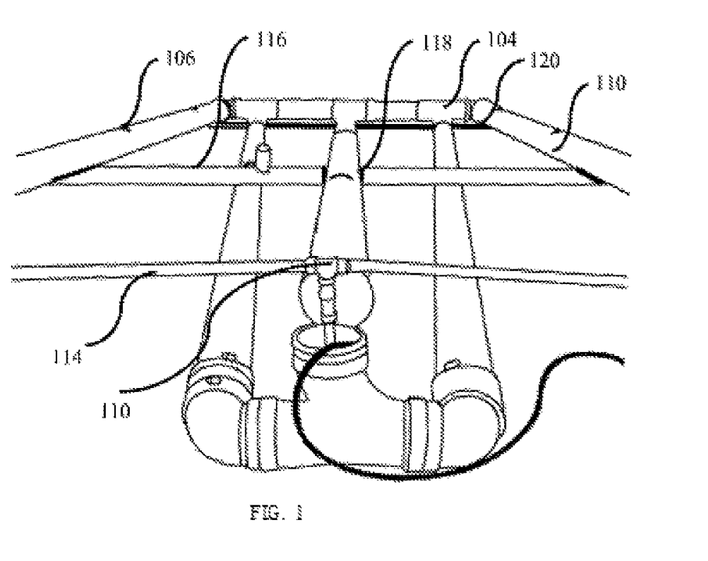
FIG. 1 illustrates a plan view of the hydroponic system, according to an embodiment herein.
Figure 1A:
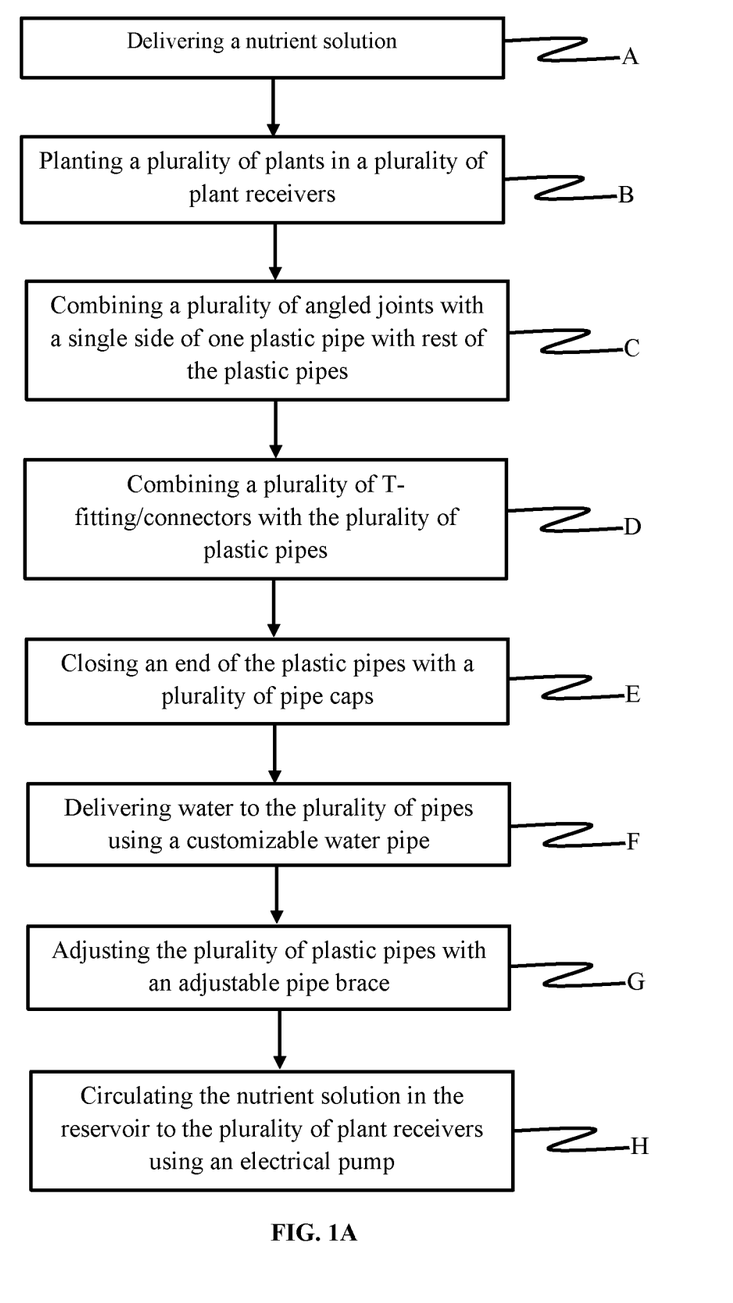
FIG. 1A is a flow chart showing the various steps involved in the method of delivering nutrients to the plants in a hydroponic system, according to an embodiment herein.

FIG. 1A is the flow chart showing the various steps involved in the method of delivering nutrients to the plants in a hydroponic system, according to an embodiment herein. With respect to FIG. 1A, the method comprises delivering a nutrient solution (A). The nutrient solution is delivered through a plurality of plastic pipes. The plurality of pipes act as a reservoir for storing and feeding the nutrient solution to a plurality of plants. The length of plurality of plastic pipes are customized based on a requirement of a user and a type of plant grown.

The method for delivering nutrients to the plants in a hydroponic system further comprises planting a plurality of plants in a plurality of plant receivers (B). The plurality of plant receivers are cavities arranged in the plurality of plastic pipes. The size and depth of the plant receivers are varied based on a requirement of a user and a type of plant grown.

The method for delivering nutrients to the plants in a hydroponic system further comprises combining a plurality of angled joints with a single side of one plastic pipe with rest of the plastic pipes (C). The plurality of the angled joints are combined using a standard plumbing technique.

The method for delivering nutrients to the plants in a hydroponic system further comprises combining a plurality of T-fitting/connectors with the plurality of plastic pipes (D). The plurality of T-fitting/connectors are combined with the plurality of pipes using a standard plumbing technique.

The method for delivering nutrients to the plants in a hydroponic system further comprises closing an end of the plastic pipes with a plurality of pipe caps (E).

The method for delivering nutrients to the plants in a hydroponic system further comprises delivering water to the plurality of pipes using a customizable water pipe (F).

The method for delivering nutrients to the plants in a hydroponic system further comprises adjusting the plurality of plastic pipes with an adjustable pipe brace (G). The adjustable pipe brace and a nut is configured to vary a height and tilt of the hydroponic solution and circulating the nutrient solution in the reservoir to the plurality of plant receivers using an electrical pump (H).

The method for delivering nutrients to the plants in a hydroponic system further comprises varying a height and a tilt of the plurality of pipes using an adjustable pipe lift nut. The adjustable pipe lift nut is placed on the adjustable pipe brace.

The method for delivering nutrients to the plants in a hydroponic system further comprises customizing using an extra pipe according to needs of a user and the plant. The extra pipe length is combined with the plurality of the plastic pipes using a standard plumbing techniques.

The method for delivering nutrients to the plants in a hydroponic system further comprises delivering the nutrients to the plants in an indoor environment.

The method for delivering nutrients to the plants in a hydroponic system further comprises delivering the nutrients to the plants in an outdoor environment.

The embodiments herein provide a method of delivering nutrients to the plants using a hydroponic system having a self-contained reservoir. The system comprises, a plurality of plastic pipes that act as a plurality of plant receivers, a plurality of angled joints which are angled at 90°, a plurality of T-fittings/connectors, a plurality of pipe caps, a customizable water pipe, an adjustable pipe brace and an electrical pump.

According to an embodiment herein, the plurality of plastic pipes are used for delivering a nutrient solution. The nutrient solution flows in the plurality of plastic pipes. According to an embodiment herein, the length of plurality of plastic pipes are customizable based on a requirement of the user and a type of plant grown.

According to an embodiment herein, the plurality of plant receivers are provided on the plurality of pipes for receiving a plant, and the plurality of plant receivers are cavities formed in the plurality of plastic pipes. According to an embodiment herein, the size and the depth of the plant receivers are customizable based on the requirement of the user and a type of plant grown.

According to an embodiment herein, the plurality of angled joints are used for combining a single side of the plastic pipe with the rest of the plastic pipes of the hydroponic system, and the plurality of the angled joints are combined using a standard plumbing technique.

According to an embodiment herein, the plurality of T-fittings/connectors are used for combining both the sides of the plastic pipes with the rest of the plastic pipes of the hydroponic system, and the plurality of T-fittings/connectors are combined using a standard plumbing technique.

According to an embodiment herein, the plurality of pipe caps are used for closing the ends of the plastic pipes, and wherein the pipe caps fit to the size of the plastic pipes. The plurality of pipe caps are used for closing the plurality of plastic pipes temporarily.

According to an embodiment herein, the self-contained reservoirs are used for storing and feeding a nutrient solution to the plurality of plants in the plurality of plant receivers, and the plurality of plant receivers are arranged on the plurality of plastic pipes.

According to an embodiment herein, the customizable water pipe is used for delivering the nutrient solution from the reservoir, and the customizable water pipe is attached to the plurality of plastic pipes which act as reservoirs.

According to an embodiment herein, the adjustable pipe brace is used for adjusting the plurality of plastic pipes, and the adjustable pipe brace is provided to vary or customize a height and a tilt of the hydroponic system.

According to an embodiment herein, the electrical pump is used for receiving water from a water tank/pipe and to circulate the nutrient solution in the plurality of plastic pipes.

According to an embodiment herein, the hydroponic system further comprises an adjustable pipe lift nut for customizing the height and the tilt of the hydroponic system, and the adjustable pipe lift nut is mounted on the adjustable pipe brace.

According to an embodiment herein, the hydroponic system further comprises an extra pipe for customizing the system according to the needs of the user and the plant, and the extra pipe is combined with the plurality of the plastic pipes using a standard plumbing techniques.

According to an embodiment herein, the hydroponic system is set up in an outdoor environment.

According to an embodiment herein, the hydroponic system is set up in an indoor environment.

The embodiments herein provide a method for delivering nutrient solutions to the plants through a hydroponic system. The method comprises, assembling the hydroponic system, selecting a plurality of plants that has to be grown in the hydroponic solution, delivering nutrient solution to the roots of the selected plant from the reservoir, and customizing the hydroponic system.

According to an embodiment herein, assembling of the hydroponic system includes combining a plurality of plastic pipes which act as a plurality of plant receivers, a plurality of angled joints, a plurality of T-joints/connectors, a plurality of pipe covers, and a water pipe using a standard plumbing techniques.

According to an embodiment herein, the plurality of plants are selected based on user preferences and environmental constraints.

According to an embodiment herein, the nutrient solution is circulated continuously to the roots of the plant through the plurality of plastic pipes and water pipes. According to an embodiment herein, the nutrient solution is circulated using an electrical pump.

According to an embodiment herein, the step of customizing the hydroponic system comprises adjusting a height and tilt of the hydroponic system. According to an embodiment herein, the height and the tilt of the hydroponic system is customized using a plurality of adjustable pipe braces and a plurality of adjustable lift nuts.

According to an embodiment herein, the method further comprises maintaining the nutrient solution at a pre-determined level to avoid addition of oxygen.

According to an embodiment herein, the method further comprises controlling the amount of the nutrient solution delivered to the plants grown using hydroponic system.

According to an embodiment herein, the amount of the delivery of the nutrient solution is dependent on the environmental factors and the type of the plant grown in the hydroponic system.

Figure 2:
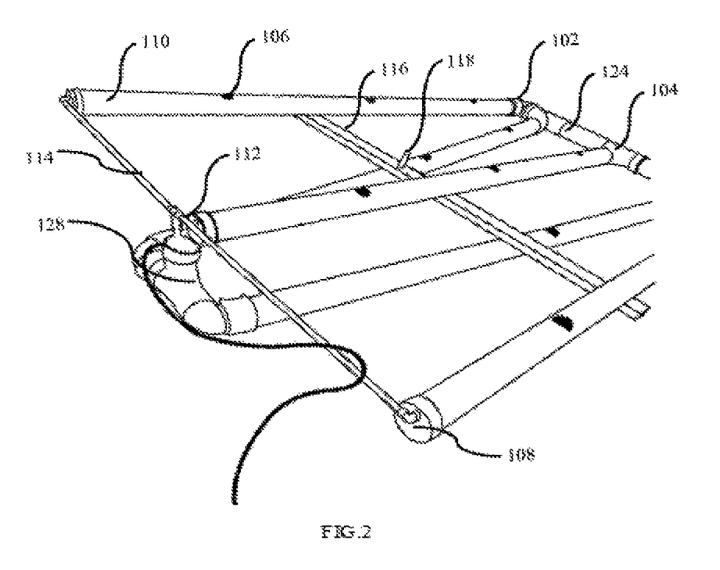
FIG. 2 illustrates a side view of the hydroponic system according to an embodiment herein.
Figure 3:
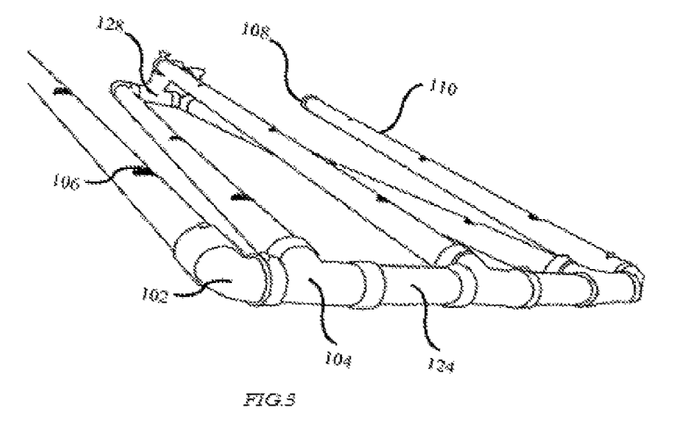
FIG. 3 illustrates a rear side view of the hydroponic system, according to an embodiment herein.
Figure 4:
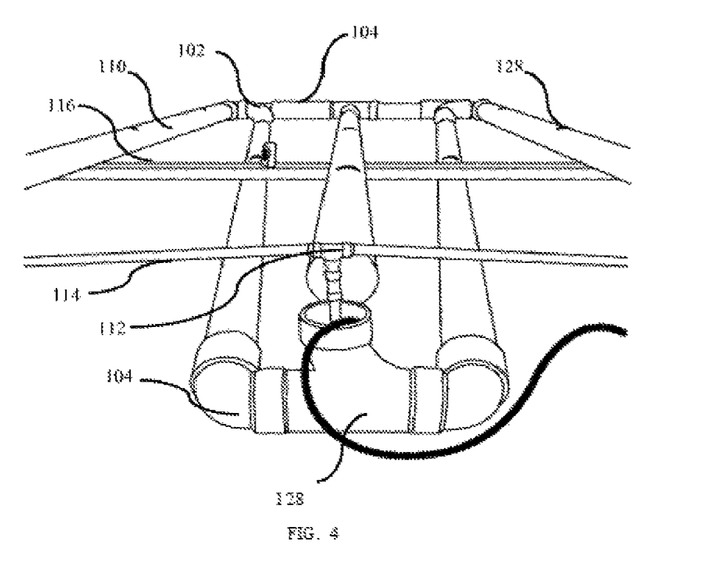
FIG. 4 illustrates a front side view of the hydroponic system, according to an embodiment herein.
Figure 5:
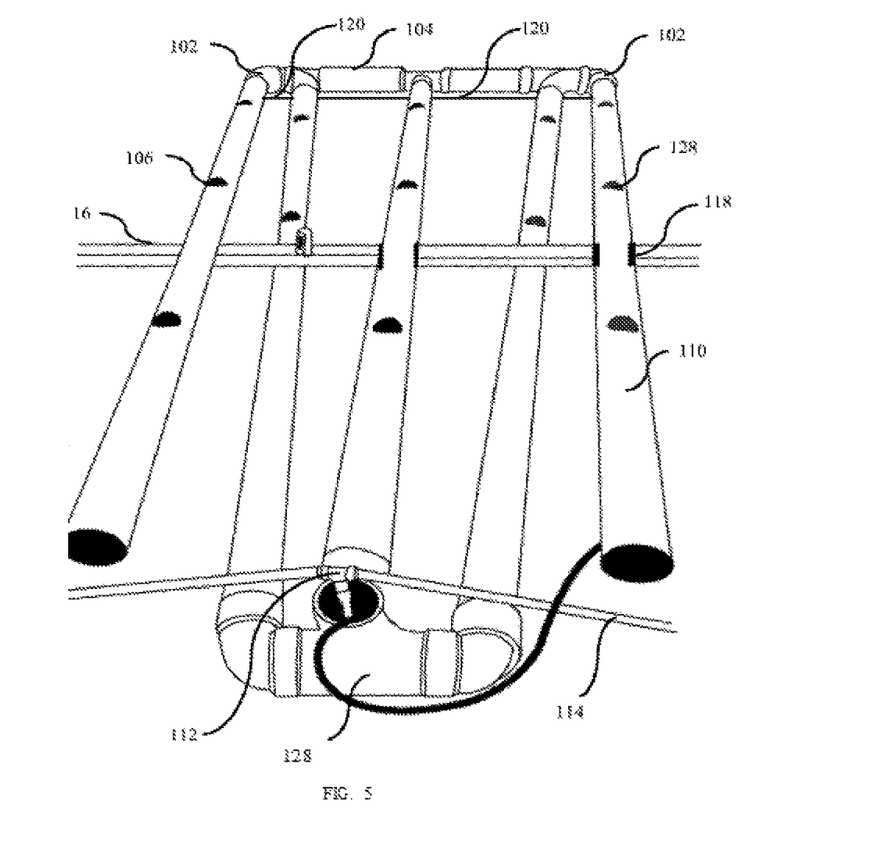
FIG. 5 illustrates a top side view of the hydroponic system, according to an embodiment herein.

FIG. 1 illustrates a plan view of the hydroponic system, while the FIG. 2 illustrates a side view of the hydroponic system. FIG. 3 illustrates a rear side view of the hydroponic system, while the FIG. 4 illustrates a front side view of the hydroponic system. FIG. 5 illustrates a top perspective view of the hydroponic system, according to an embodiment herein.

With respect to FIG. 1-FIG. 5, the hydroponic system 100 includes the flexible angled joints (bent at an angle of 90°) 102, the flexible T-joint/connectors 104, the custom plant receiver 106, the pipe caps 108, the custom length plastic pipes 110, the T-fitting/connectors 112, the water pipe 114, the adjustable pipe brace 116, the adjustable pipe lift nut 118, the lift brace assembly 120, the extra pipe 124, and the pump covering 128.

According to one embodiment herein, the T-fitting/connector 112 is a ½ inch T-fitting, and the water pipe 114 is a ½ inch water pipe 114.

The hydroponic nutrient delivery system allows a plurality of plants to grow with the help of the nutrient solution, without using the soil. According to an embodiment herein, the nutrient solution for the plants is circulated continuously in the plastic pipes 110. The nutrient solution is circulated in the plastic pipes 110 using an electrical pump.

According to an embodiment herein, the plants grow in the custom plant receiver 106. The custom plant receiver 106 is a cavity where the plant is allowed to grow. According to an embodiment herein, the roots of the plants are received and stored in the custom plant receiver 106. The custom plant receiver 106 allows the plant to breathe, without allowing an excessive evaporation of the nutrient solution. Further, the custom plant receiver 106 prevents the plant roots from decay, due to excessive supply of the nutrient solution.

According to an embodiment herein, the depth of the cavity of the custom plant receiver 106 is fixed. According to an embodiment herein, the depth of the cavity of the custom plant receiver 106 is varied, and an option for customizing the cavity is provided to the user.

The hydroponic nutrients are delivered to the plant using the plastic pipes 110. According to an embodiment herein, the hydroponic solutions used for different types of plants are mutually different. According to an embodiment herein, the plastic pipes 110 are customized based on the need of a user and type of plant. According to an embodiment herein, the plastic pipes 110 are not flexible. According to an embodiment herein, the custom plant receiver 106 is received on the plastic pipe 110. According to an embodiment herein, the plastic pipes 110 contain nutrients solution, which is circulated continuously using the electrical pump.

To construct a complete hydroponic system, a plurality of customizable plastic pipes 110 are combined together using the flexible 90° joints 102 and the flexible T-fitting/connectors 104. According to an embodiment herein, the flexible 90° joints 102 and the flexible T-fitting/connectors 104 are used for expanding the hydroponic system both horizontally and vertically. The system is scalable in size based on a requirement of the user and the type of plant grown. According to an embodiment herein, the number of flexible 90° degree joints 102 and the number of flexible T-fitting 104 are increased or decreased based on the need of the user.

According to an embodiment herein, the flexible 90° joints are used for combining the customizable plastic pipes 110 at the end with the other plastic pipes 110. According to an embodiment herein, the flexible T-fitting 104 is used for combining the customizable plastic pipes 110 at the both ends.

According to an embodiment herein, the ends of the plastic pipes 110 are covered using the pipe caps 108. The pipe caps 108 prevent a spilling or wastage of the nutrient solution from the plastic pipes 110. According to an embodiment herein, each end of the plastic pipes 110 is covered using the pipe caps.

According to an embodiment herein, only one end of the plastic pipes 110 is covered using the pipe caps 108. According to an embodiment herein, the pipe caps 108 have a fixed shape and size. According to an embodiment herein, the pipe caps 108 are flexible, and are customizable.

According to an embodiment herein, the hydroponic system includes the adjustable pipe brace assembly. The adjustable pipe brace assembly has a base 120 provided with grooves/slots to receive a pipe holder or a pipe support to support the plurality of pipes in the hydroponic system. The adjustable pipe brace assembly allows the user to customize the heights and the tilts of the plastic pipes 110 with respect to the ground. According to an embodiment herein, the pipe braces 116 are flexible and allows the users to adjust the height and the tilts of the plastic pipes 110 based the requirements of the plant. According to an embodiment herein, the pipe braces 116 are permanently combined with the plastic pipes 110. According to an embodiment herein, the pipe braces 116 are temporarily fixed to the plastic pipes 110.

According to an embodiment herein, the pipe braces 116 are adjusted for the height and tilt using the pipe lift nut 118. The pipe lift nut 118 enables the user to adjust the height and the tilt of the plastic pipe 110. Further, the pipe lift nut 118 provides a cushioning effect for the plastic pipes 110 for efficient delivery of the nutrient solution.

According to an embodiment herein, the lift brace 120 allows the modification of the hydroponic system. According to an embodiment herein, the lift brace 120 allows the user to modify the height of the hydroponic system. According to an embodiment herein, the lift brace 120 are customizable and are modified according to the needs of the user and the needs of the plant.

The hydroponic system 100 includes the extra pipe length 124 that is used for modifying the length of the hydroponic system. According to an embodiment herein, the extra pipe length 124 has a fixed length and is combined with the plastic pipes 110 permanently. According to an embodiment herein, the extra pipe 124 has a variable length and is adjusted according to the needs of the system.

The hydroponic system includes the electrical pump for circulating the nutrient solution throughout the plastic pipes 110. According to an embodiment herein, the electrical pump is secured to the pipes through the T-joint. According to an embodiment herein, the hydroponic system includes an in-built pump with a predetermined capacity to circulate the nutrient solution at a pre-determined speed. According to an embodiment herein, the speed of the circulation is determined by the user. According to an embodiment herein, the speed of the circulation is predetermined by the manufacturer of the hydroponic system.

Figure 6:
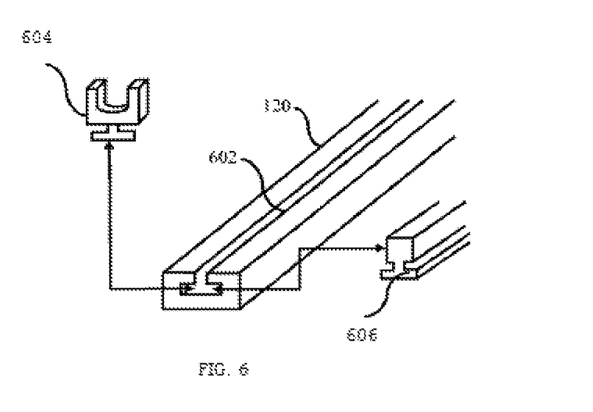
FIG. 6 illustrates an exploded perspective view of an assembly of adjustable braces, according to an embodiment herein.

FIG. 6 illustrates an exploded view of the lift brace assembly 120. The lift brace assembly includes a base 602 provided with a longitudinal groove/slot 604 for receiving a U-shaped pipe holder 606 or an I-shaped beam support 608 to receive and hold the plurality of pipes at a desired height in the hydroponic system.

According to an embodiment herein, the hydroponic system is provided with a self-contained reservoir. The electrical pump circulates the water from the self-contained reservoir. According to an embodiment herein, the self-contained reservoir comprises nutrient solutions that are required for the plant growth. According to an embodiment herein, oxygen and additional nutrients are added periodically to the self-contained reservoir to ensure adequate supply of nutrients to the plants. According to an embodiment herein, addition of oxygen is not required to the self-contained reservoir, when the nutrient solution is maintained at a pre-determined level.

Figure 7:
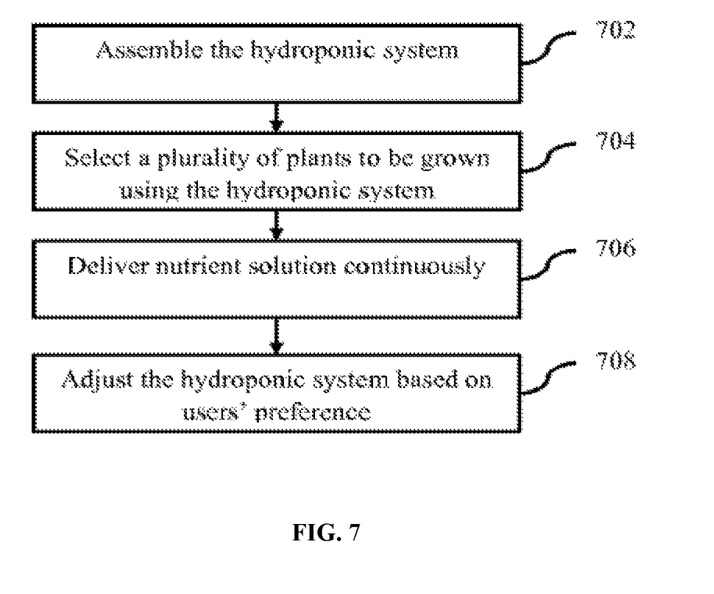
FIG. 7 illustrates a flowchart explaining a method for delivering nutrients in a hydroponic system, according to an embodiment herein.

FIG. 7 illustrates a flowchart for delivering a nutrient solution to the plant in a hydroponic system, according to an embodiment herein. According to an embodiment herein, the hydroponic nutrient delivery system comprises a self-contained reservoir. The nutrient solution is pumped to a plurality of plant housings fixed on a plurality of plastic pipes, which allows the nutrient water to flow continuously over the plant roots. According to an embodiment herein, continuous flow of the nutrient solution over the plant roots allow the roots to grow freely, which results in an efficient and faster growth of the plant.

To cultivate the plants using the hydroponic system, initially the hydroponic system is assembled (Step 702). According to an embodiment herein, the hydroponic system is assembled by combining a plurality of plastic pipes, using a plurality of joints, and a plurality of braces, and the like. The plurality of pipes act as a reservoir for storing and feeding the nutrient solution to the plurality of plants. According to an embodiment herein, the assembly of the hydroponic system is easy and customizable based on the requirement of the user and the type of plant grown. According to an embodiment herein, the number of plant housings fixed on the plastic pipes in the hydroponic system are fixed. According to an embodiment herein, the number of plant housings fixed on the plastic pipes are variable and are customized according to the needs of the customer.

Once the hydroponic system is assembled, the type of the plant grown on the hydroponic system is decided (Step 704). According to an embodiment herein, same type of plants are grown in the whole of the hydroponic system. According to an embodiment herein, a plurality of varieties of plants are grown in the hydroponic system. The plants are grown using a plurality of standard hydroponic procedure.

Further, a continuous flow nutrient solution is delivered to the roots of the plant in the hydroponic system. According to an embodiment herein, the nutrient solution is delivered and circulated using the pump (Step 706). According to an embodiment herein, the continuous flow of the nutrient solution allows roots to absorb adequate nutrients. Further, the continuous flow of the nutrient solution prevents the roots of the plant from decaying.

Once the plants are delivered with the hydroponic nutrient solution, the hydroponic system is adjusted based on the requirement of the user and the type of plant grown (Step 708). According to an embodiment herein, the height and tilt of the pipes in the hydroponic system are adjusted. According to an embodiment herein, the height and tilt of the pipes in the hydroponic system is adjusted using the lift nuts and the braces.

According to an embodiment herein, the hydroponic system is provided as a kit, which reduces the burden on the users to buy each components as individual parts.

According to an embodiment herein, the assembly of the hydroponic system is simple and easy to customize.

According to an embodiment herein, the hydroponic system delivers the nutrient solution continuously, ensuring an adequate growth of the roots, and preventing decay of the plants.

According to an embodiment herein, the hydroponic system uses less median inside the custom plant receivers.

According to an embodiment herein, the hydroponic system includes a self-reservoir, which saves the overall space of the hydroponic system.

According to an embodiment herein, the cleaning of the hydroponic system is easier.

According to an embodiment herein, the hydroponic system is modifiable and customizable based on the requirements of the plant and the users.

According to an embodiment herein, the hydroponic system is used both in indoor and outdoor environments.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A method for delivering nutrients to the plants in a hydroponic system comprises:
    delivering a nutrient solution, wherein the nutrient solution is delivered through a plurality of plastic pipes, wherein the plurality of pipes act as a reservoir for storing and feeding the nutrient solution to a plurality of plants, and wherein a length of plurality of plastic pipes are customized based on a requirement of a user and a type of plant grown;
    planting a plurality of plants in a plurality of plant receivers, wherein the plurality of plant receivers are cavities arranged in the plurality of plastic pipes, and wherein a size and a depth of the plant receivers are varied based on a requirement of a user and a type of plant grown;
    combining a plurality of angled joints with a single side of one plastic pipe with rest of the plastic pipes, and wherein the plurality of the angled joints are combined using a standard plumbing technique;
    combining a plurality of T-fitting/connectors with the plurality of plastic pipes, and wherein the plurality of T-fitting/connectors are combined with the plurality of pipes using a standard plumbing technique;
    closing an end of the plastic pipes with a plurality of pipe caps;
    delivering water to the plurality of pipes using a customizable water pipe;
    adjusting the plurality of plastic pipes with an adjustable pipe brace, wherein the adjustable pipe brace and a nut is configured to vary a height and tilt of the hydroponic solution; and
    circulating the nutrient solution in the reservoir to the plurality of plant receivers using an electrical pump.

2. The method according to claim 1, wherein the method further comprises varying a height and a tilt of the plurality of pipes using an adjustable pipe lift nut, and wherein the adjustable pipe lift nut is placed on the adjustable pipe brace.

3. The method according to claim 1, wherein the method further comprises customizing using an extra pipe according to needs of a user and the plant, and wherein the extra pipe length is combined with the plurality of the plastic pipes using a standard plumbing techniques.

4. The method according to claim 1, wherein the nutrients are delivered to the plants in an indoor environment.

5. The method according to claim 1, wherein the nutrients are delivered to the plants in an outdoor environment.

* * * * *